(12) United States Patent
Lee et al.

(10) Patent No.: US 9,903,764 B2
(45) Date of Patent: Feb. 27, 2018

(54) INTEGRATED CIRCUIT FOR ESTIMATING POWER OF AT LEAST ONE NODE USING TEMPERATURE AND A SYSTEM INCLUDING THE SAME

(71) Applicant: SAMSUNG ELECTRONICS CO., LTD., Suwon-si, Gyeonggi-Do (KR)

(72) Inventors: Kyungsoo Lee, Yongin-si (KR); Sridhar Sundaram, Austin, TX (US); Wook Kim, Yongin-si (KR); Jichul Kim, Yongin-si (KR); MyungKyoon Yim, Seoul (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 416 days.

(21) Appl. No.: 14/617,097

(22) Filed: Feb. 9, 2015

(65) Prior Publication Data

US 2016/0092617 A1    Mar. 31, 2016

Related U.S. Application Data

(60) Provisional application No. 62/057,422, filed on Sep. 30, 2014, provisional application No. 62/060,093, filed on Oct. 6, 2014.

(51) Int. Cl.
*G06F 17/50* (2006.01)
*G01K 1/02* (2006.01)
*G01K 7/42* (2006.01)

(52) U.S. Cl.
CPC .............. *G01K 1/026* (2013.01); *G01K 7/425* (2013.01); *G06F 17/5036* (2013.01); *G06F 2217/80* (2013.01)

(58) Field of Classification Search
CPC ........ G01K 7/425; G01K 1/16; H01L 27/105; H04L 12/12; G06F 1/325; G06F 1/203; G06F 17/5022; G06F 1/206; H03F 3/3069; G01R 31/31719; G01N 33/00
See application file for complete search history.

(56) References Cited

U.S. PATENT DOCUMENTS

| | | | |
|---|---|---|---|
| 5,630,110 A | 5/1997 | Mote, Jr. | |
| 6,119,241 A | 9/2000 | Michail et al. | |
| 7,814,350 B2 | 10/2010 | Gaskins et al. | |
| 8,700,925 B2 | 4/2014 | Wyatt | |
| 9,116,137 B1* | 8/2015 | Gettings | G01N 33/00 |
| 2004/0109276 A1* | 6/2004 | Mendenhall | H03F 3/3069 361/100 |
| 2006/0164111 A1* | 7/2006 | Lopez | G01K 1/16 324/750.03 |

(Continued)

*Primary Examiner* — Kandasamy Thangavelu
(74) *Attorney, Agent, or Firm* — F. Chau & Associates, LLC

(57) ABSTRACT

A power estimation circuit including: a power estimation manager circuit configured to receive power data and temperature data; and a storage circuit that includes a first region storing resistive-capacitive (RC) thermal modeling data, a second region storing the power data and a third region storing the temperature data, wherein the power estimation manager circuit is configured to estimate power consumption of a first node at a second time point, which occurs after a first time point, using the RC thermal modeling data, the power data and the temperature data.

21 Claims, 11 Drawing Sheets

(56) References Cited

U.S. PATENT DOCUMENTS

| | | | |
|---|---|---|---|
| 2007/0168151 A1* | 7/2007 | Kernahan | G01K 7/425 |
| | | | 702/132 |
| 2011/0271130 A1* | 11/2011 | Neuscheler | H04L 12/12 |
| | | | 713/323 |
| 2012/0066535 A1* | 3/2012 | Naffziger | G06F 1/206 |
| | | | 713/340 |
| 2012/0110352 A1 | 5/2012 | Branover et al. | |
| 2012/0273773 A1* | 11/2012 | Ieda | H01L 27/105 |
| | | | 257/43 |
| 2013/0132972 A1 | 5/2013 | Sur et al. | |
| 2013/0227261 A1 | 8/2013 | Anderson et al. | |
| 2014/0035560 A1* | 2/2014 | Olmos | G01R 31/31719 |
| | | | 324/76.41 |
| 2014/0245032 A1* | 8/2014 | Vadakkanmaruveedu | |
| | | | G06F 1/203 |
| | | | 713/300 |
| 2015/0199460 A1* | 7/2015 | Sundaresan | G06F 17/5022 |
| | | | 716/109 |
| 2015/0268101 A1* | 9/2015 | Kumahara | G06F 1/325 |
| | | | 374/178 |

* cited by examiner $$Ti(t) = \left[ \frac{R1idt}{2R1iC1i+dt}[P1(t)+P1(t-dt)] + \frac{2R1iC1i-dt}{2R1iC1i+dt} * Ti(t-dt) \right]$$
$$+ \left[ \frac{R2idt}{2R2iC2i+dt}[P2(t)+P2(t-dt)] + \frac{2R2iC2i-dt}{2R2iC2i+dt} * Ti(t-dt) \right] + \cdots$$
$$+ \left[ \frac{Rnidt}{2RniCni+dt}[Pi(t)+Pi(t-dt)] + \frac{2RniCni-dt}{2RniCni+dt} * Ti(t-dt) \right]$$

EPW

FIG. 4B

```
              T(t+dt1)
      dt      ↓dt1
  ├─────────┤├───┤
  ┼─────────┼───┼──► Time
 T(t-dt)    T(t)
```

Error Compensation : P1(t)→P1'(t)

$$Ti(t) = \left[ \frac{R1idt}{2R1iC1i+dt} [\boxed{?} + P1(t-dt)] + \frac{2R1iC1i-dt}{2R1iC1i+dt} * Ti(t-dt) \right]$$

$$+ \left[ \frac{R2idt}{2R2iC2i+dt} [P2(t)+P2(t-dt)] + \frac{2R2iC2i-dt}{2R2iC2i+dt} * Ti(t-dt) \right] + \cdots$$

$$+ \left[ \frac{Rnidt}{2RniCni+dt} [Pi(t)+Pi(t-dt)] + \frac{2RniCni-dt}{2RniCni+dt} * Ti(t-dt) \right]$$

$$T_i(t) = \left[ \frac{R_{1i}dt}{2R_{1i}C_{1i}+dt} [P_1'(t)+P_1(t-dt)] + \frac{2R_{1i}C_{1i}-dt}{2R_{1i}C_{1i}+dt} * T_i(t-dt) \right]$$

Error Compensation : $P_2(t) \rightarrow P_2'(t)$ $$+ \left[ \frac{R_{2i}dt}{2R_{2i}C_{2i}+dt} [\;?\;+P_2(t-dt)] + \frac{2R_{2i}C_{2i}-dt}{2R_{2i}C_{2i}+dt} * T_i(t-dt) \right] + \cdots$$

$$+ \left[ \frac{R_{ni}dt}{2R_{ni}C_{ni}+dt} [P_i(t)+P_i(t-dt)] + \frac{2R_{ni}C_{ni}-dt}{2R_{ni}C_{ni}+dt} * T_i(t-dt) \right]$$

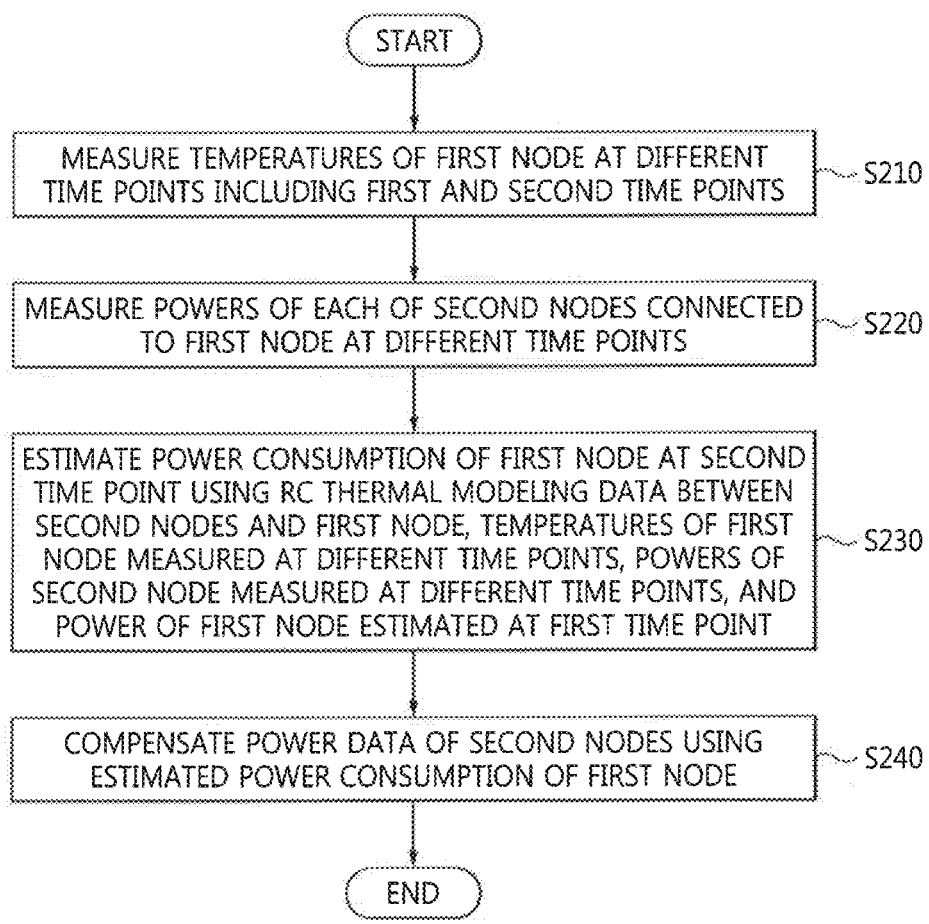

INTEGRATED CIRCUIT FOR ESTIMATING POWER OF AT LEAST ONE NODE USING TEMPERATURE AND A SYSTEM INCLUDING THE SAME

CROSS-REFERENCE TO RELATED APPLICATIONS

This application claims priority under 35 U.S.C. §119 to U.S. provisional patent application No. 62/057,422, filed Sep. 30, 2014 and U.S. provisional patent application No. 62/060,093, filed Oct. 6, 2014, the disclosures of which are incorporated by reference herein in their entireties.

TECHNICAL FIELD

Exemplary embodiments of the inventive concept relate to an integrated circuit, and more particularly, to an integrated circuit for estimating a power of at least one node using a temperature of the node and a system including the same.

DISCUSSION OF RELATED ART

A system on chip (SoC) is an integrated circuit that integrates components of a computer or other electronic systems into a single chip. The SoC includes a plurality of elements that require power to operate and generate heat.

The temperature of the elements during a given time depends on power consumed during the given time. In addition, heat generated by one of the elements may be transferred to at least one other nearby element.

In general, power consumption of an element included in a SoC is measured first and then a temperature of the element is estimated using the measured power consumption. However, there are elements included in the SoC whose power consumption is not directly measured. Therefore, power consumption measured for the SoC may be inaccurate.

SUMMARY

Exemplary embodiments of the inventive concept provide an integrated circuit for estimating power consumption of at least one node using a temperature measured at (or estimated for) the node and a system including the same.

An exemplary embodiment of the inventive concept provides a power estimation circuit comprising: a power estimation manager circuit configured to receive power data and temperature data; and a storage circuit that includes a first region storing resistive-capacitive (RC) thermal modeling data, a second region storing the power data and a third region storing the temperature data, wherein the power estimation manager circuit is configured to estimate power consumption of a first node at a second time point, which occurs after a first time point, using the RC thermal modeling data, the power data and the temperature data.

The RC thermal modeling data includes RC thermal modeling data between the first node and each of a plurality of second nodes, the power data includes power data of the second nodes at the first and second time points and estimated power consumption of the first node at the first time point, and the temperature data includes temperature data for the first node at the first time point and temperature data for the first node at the second time point.

The power estimation manager circuit is configured to correct the power data of at least one of the second nodes by using the estimated power consumption of the first node at the second time point.

The storage circuit includes a buffer, a register, a flip-flop or a random access memory.

The first and second nodes include a system component, a function block which is included in a system component, a function component which is included in a function block, or a circuit element which is included in a function component.

An exemplary embodiment of the inventive concept provides an application processor comprising: a plurality of nodes; a plurality of temperature sensors; a power estimation circuit including: a power estimation manager circuit configured to receive power data and temperature data for the nodes; and a storage circuit that includes a first region storing RC thermal modeling data for the nodes, a second region storing the power data and a third region storing the temperature data, wherein the power estimation manager circuit is configured to estimate power consumption of a first node at a second time point, which occurs after a first time point, using the RC thermal modeling data, the power data and the temperature data, wherein the application processor further comprises: a power management unit configured to provide the power data to the power estimation circuit; and a power monitoring unit configured to monitor traffic flow between the first node and a bus and a plurality of second nodes and the bus.

The RC thermal modeling data includes RC thermal modeling data between the first node and each of the plurality of second nodes, the power data includes power data of the second nodes at the first and second time points and estimated power consumption of the first node at the first time point, and the temperature data includes temperature data for the first node at the first time point and temperature data for the first node at the second time point.

At least one of the temperature sensors is used to measure temperatures of the first node at the first and second time points.

The power estimation manager circuit is configured to correct the power data of at least one of the second nodes by using the estimated power consumption of the first node at the second time point.

At least one of the temperature sensors is used to measure temperatures of the first node at different time points.

The storage circuit includes a buffer, a register, a flip-flop or a random access memory.

The first and second nodes include a system component, a function block which is included in a system component, a function component which is included in a function block, or a circuit element which is included in a function component.

The estimated power consumption of the first node at the second time point is provided to the power management unit from the power estimation circuit.

The power data is provided to the power estimation circuit from the power monitoring unit.

An exemplary embodiment of the inventive concept provides a mobile system comprising: an application processor including a plurality of nodes and a power estimation circuit, the power estimation circuit including: a power estimation manager circuit configured to receive power data and temperature data for the nodes; and a storage circuit that includes a first region storing RC thermal modeling data for the nodes, a second region storing the power data and a third region storing the temperature data, wherein the power estimation manager circuit is configured to estimate power consumption of a first node at a second time point, which occurs after a first time point, using the RC thermal modeling data, the power data and the temperature data.

The RC thermal modeling data includes RC thermal modeling data between the first node and each of a plurality of second nodes, the power data includes power data of the second nodes at the first and second time points and estimated power consumption of the first node at the first time point, and the temperature data includes temperature data for the first node at the first time point and temperature data for the first node at the second time point.

The power estimation manager circuit is configured to correct the power data of at least one of the second nodes by using the estimated power consumption of the first node at the second time point.

The mobile system further comprises: a display and a memory connected to the application processor.

The mobile system further comprises: a power management integrated circuit configured to provide the power data to the power estimation manager circuit.

The estimated power consumption of the first node at the second time point is used to determine overall power consumption of the application processor.

The overall power consumption of the application processor is used to determine overall power consumption of the mobile system.

Skin temperature of the mobile system is estimated based on the overall power consumption of the mobile system.

An exemplary embodiment of the inventive concept provides a method of estimating power consumption in an integrated circuit comprising: receiving temperature data for a first node at a second time point which occurs after a first time point; estimating power consumption of the first node at the second time point by using the temperature data for the first node at the second time point, temperature data for the first node at the first time point, RC thermal modeling data between the first node and each of a plurality of second nodes, power data of the second nodes at the first and second time points, and estimated power consumption of the first node at the first time point; and storing the estimated power consumption of the first node at the second time point.

The method further comprises: correcting the power data of at least one of the second nodes by using the estimated power consumption of the first node at the second time point.

BRIEF DESCRIPTION OF THE DRAWINGS

The above and other features of the inventive concept will become more apparent by describing in detail exemplary embodiments thereof with reference to the attached drawings in which:

FIGS. 4B and 4C show equations for explaining a method of compensating power data of second nodes using the power estimation circuit illustrated in FIG. 2, according to an exemplary embodiment of the inventive concept;

FIG. 9 is a flowchart of an operation of the computing system illustrated in FIG. 1, 6, 7, or 8 according to an exemplary embodiment of the inventive concept.

DETAILED DESCRIPTION OF THE EMBODIMENTS

Figure 1:
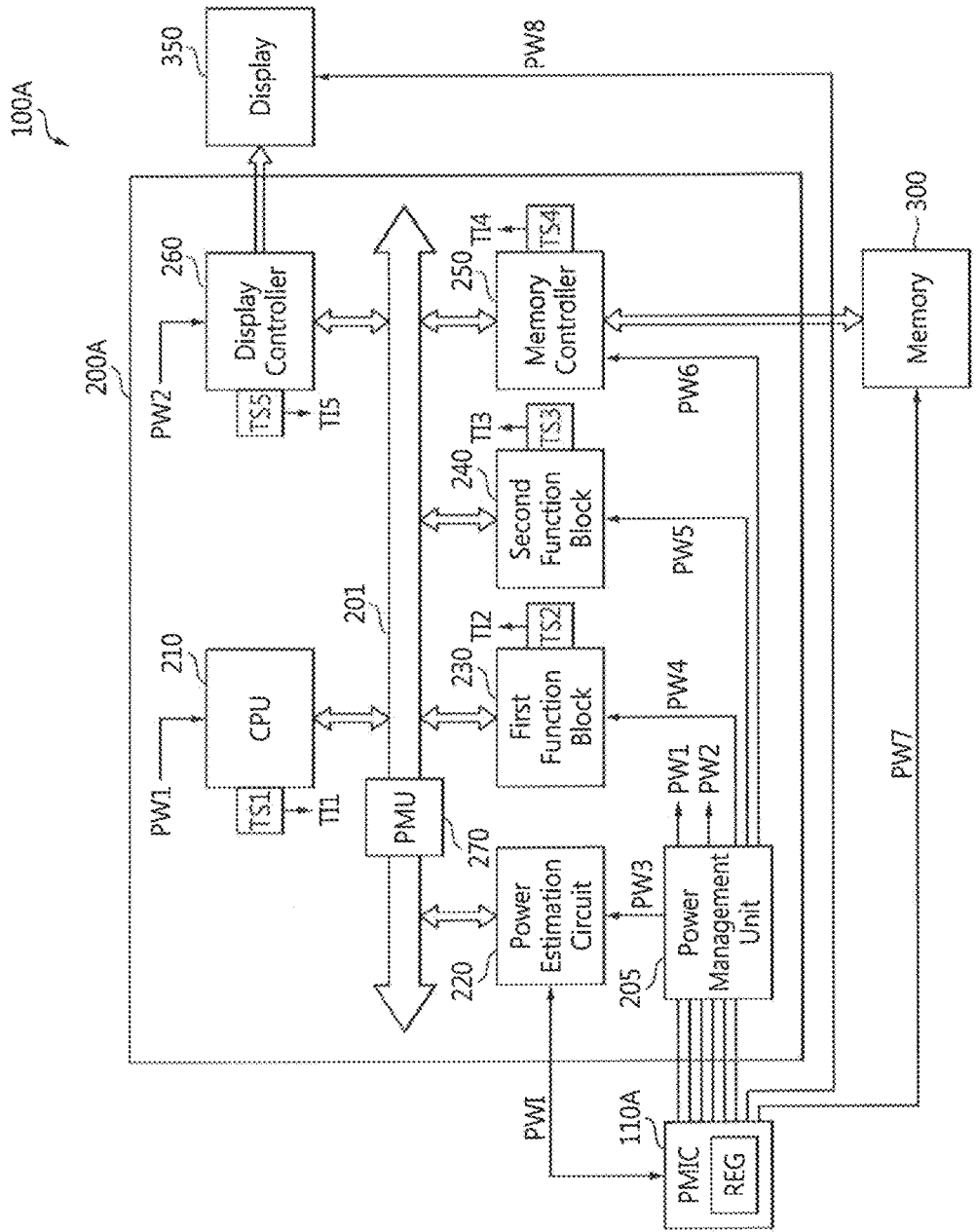
FIG. 1 is a block diagram of a computing system according to an exemplary embodiment of the inventive concept.

The inventive concept now will be described more fully hereinafter with reference to the accompanying drawings, in which exemplary embodiments thereof are shown. This inventive concept may, however, be embodied in many different forms and should not be construed as limited to the embodiments set forth herein. In the drawings, the size and relative sizes of layers and regions may be exaggerated for clarity. Like numbers may refer to like elements throughout the specification and drawings.

It will be understood that when an element is referred to as being "connected" or "coupled" to another element, it can be directly connected or coupled to the other element or intervening elements may be present.

As used herein, the singular forms "a", "an" and "the" are intended to include the plural forms as well, unless the context clearly indicates otherwise.

In an exemplary embodiment of the inventive concept, a node may be a heat source that generates heat according to power supplied to the node or a heat sink that absorbs or dissipates heat. In an exemplary embodiment of the inventive concept, power may be calculated (e.g., estimated or measured) based on an operating voltage or an operating current.

In an exemplary embodiment of the inventive concept, a node may be a system component, e.g., a power management integrated circuit (PMIC), a system on chip (SoC), a memory, a battery, or a display panel, which is included in an electronic system and generates heat according to power consumption, but the inventive concept is not restricted thereto.

In an exemplary embodiment of the inventive concept, a node may be a function block, which is included in a system component, e.g., a SoC, and generates heat according to power consumption. The function block may be hardware, a hardware module, or an electronic circuit which has unique features. The function block may include at least one function component.

The function component may be a central processing unit (CPU), a graphics processing unit (GPU), a processor, each core (or less than all cores) in a multi-core processor, a memory, a universal serial bus (USB) device, a bus, a digital signal processor (DSP), an image signal processor (ISP), a wired interface, a wireless interface, a controller, embedded software, a codec, a video module (e.g., a camera interface, a Joint Photographic Experts Group (JPEG) processor, a video processor, or a mixer), a three-dimensional (3D) graphic core, an audio system, or a driver.

In an exemplary embodiment of the inventive concept, a node may be at least one circuit or element included in the function component.

FIG. 1 is a block diagram of a computing system 100A according to an exemplary embodiment of the inventive concept. The computing system 100A may include a PMIC 110A, an IC 200A, a memory 300, and a display 350. As an example, the PMIC 110A, the IC 200A, the memory 300, and the display 350 may be nodes as system components.

Computing systems 100A, 100B, 100C, and 100D, which will be described hereinafter (with further reference to FIGS. 6-8), may be implemented as personal computers (PCs), data servers, or mobile computing devices. A mobile computing device may be implemented as a laptop computer, a cellular phone, a smart phone, a tablet PC, a personal digital assistant (PDA), an enterprise digital assistant (EDA), a digital still camera, a digital video camera, a portable multimedia player (PMP), a personal navigation device or portable navigation device (PND), a handheld game console, a mobile internet device (MID), a wearable computer, an internet of things (IoT), an internet of everything (IoE), or an e-book.

The PMIC 110A may generate a plurality of operating voltages PW1 through PW8 for operating the computing system 100A. The PMIC 110A may generate the operating voltages PW1 through PW8 using a supply voltage output from a power supply (e.g., a battery) of the computing system 100A, but the inventive concept is not restricted thereto.

The PMIC 110A may include a storage device REG for storing power data PWI about the operating voltages PW1 through PW8. The storage device REG may be implemented as a register, e.g., a special function register (SFR), but the inventive concept is not restricted thereto.

ICs 200A, 200B, 200C, and 200D, which will be described hereinafter (with further reference to FIGS. 6-8), may be SoCs, application processors (APs), mobile APs, or controllers used as hosts that control the memory 300 and/or the display 350.

The IC 200A may include a plurality of function blocks 201, 210, 220, 230, 240, 250, and 260. Each of the function blocks 201, 210, 220, 230, 240, 250, and 260 may be a node.

The IC 200A may include a CPU 210, a power estimation circuit 220, a first function block 230, a second function block 240, a memory controller 250, and a display controller 260.

The IC 200A may also include one or more temperature sensors TS1 through TS5. The temperature sensors TS1 through TS5 may respectively sense temperatures of the respective function blocks 210, 230, 240, 250, and 260 and may generate temperature data TI1 through TI5, respectively, according to sensing results. Although the temperature sensors TS1 through TS5 for measuring the temperatures of the respective function blocks 210, 230, 240, 250, and 260 are illustrated in FIG. 1, the numbers and positions of temperature sensors may vary. For example, two temperature sensors may be used to sense one function block, or the temperature sensor TS5 for sensing the temperature of the display controller 260 may be placed farther/closer from/to a bus architecture 201.

The IC 200A may further include a power management unit 205 and a performance monitoring unit (PMU) 270. The power management unit 205 will be described later with reference to FIG. 6. The PMU 270 will be described later with reference to FIG. 8.

The CPU 210 may control the operations of the power estimation circuit 220, the first function block 230, the second function block 240, the memory controller 250, and/or the display controller 260 through the bus architecture 201. The bus architecture 201 may be implemented as an advanced microcontroller bus architecture (AMBA), an advanced high-performance bus (AHB), an advanced peripheral bus (APB), an Advanced eXtensible Interface (AXI), or an advanced system bus (ASB), but the inventive concept is not restricted thereto.

The CPU 210 may control resistive-capacitive (RC) thermal modeling data input from an outside of the IC 200A to be stored in the power estimation circuit 220. RC thermal modeling will be described in detail with reference to FIG. 3 later.

In an exemplary embodiment of the inventive concept, the CPU 210 may generate RC thermal modeling data and may control the RC thermal modeling data to be stored in the power estimation circuit 220.

The CPU 210 may use a netlist, a timing library, a standard parasitic exchange format (SPEF) file, or a standard delay format (SDF) file, which are provided from an outside of the IC 200A, to generate the RC thermal modeling data. The timing library may include a cell delay description and the SPEF file may include an interconnection delay description.

At least one of the temperature sensors TS1 through TS5 may be used to measure or estimate temperatures of a first node at different time points including a first time point and a second time point.

The power estimation circuit 220 may receive the power data PWI about powers (or power consumption) of second nodes connected to the first node at the different time points including the first and second time points.

The power estimation circuit 220 may estimate a power consumption of the first node at the second time point using RC thermal modeling data between each of the second nodes and the first node, a temperature measured at the first node at each of the different time points, a power measured at each of the second nodes at each of the different time points, and a power of the first node estimated by the power estimation circuit 220 at the first time point.

A method of estimating a power consumption of the first node will be described with reference to FIGS. 3 and 4A later.

The power estimation circuit 220 may compensate (or correct) power data measured (or estimated or calculated) for each of the second nodes, using the power consumption (or power consumption data) estimated for the first node at the second time point. A method of compensating (or correcting) power data of the second nodes will be described in detail with reference to FIGS. 4B, 4C, and 5 later.

In an exemplary embodiment of the inventive concept, the power estimation circuit 220 may estimate power consumption of a node from a temperature of the node using the method which will be described with reference to FIG. 4A. Nodes whose power consumption may be estimated by this method include nodes whose power consumption might not be estimated by prior techniques, nodes whose power consumption might not be estimated with high accuracy, or nodes whose power consumption estimates are complicated to obtain.

The first function block 230 may be implemented as an ISP, but the inventive concept is not restricted thereto. The second function block 240 may be implemented as a GPU, but the inventive concept is not restricted thereto.

The memory controller 250 may control the operation of the memory 300. For example, the memory controller 250 may write data to the memory 300 or read data from the memory 300 according to the control of the CPU 210.

Although one memory controller 250 and one memory 300 are illustrated in FIG. 1, the inventive concept is not restricted thereto. In an exemplary embodiment of the inventive concept, a memory may be a memory set including a plurality of memories and a plurality of memory controllers may control the operation of the plurality of memories, respectively.

The memories may include a volatile memory and/or a non-volatile memory. When the memories include a dynamic random access memory (DRAM) and a flash-based memory (e.g., NAND flash memory or NOR flash memory), the memory controllers may include a DRAM controller and a flash-based memory controller.

The display controller 260 may transmit data from the CPU 210, the first function block 230, the second function block 240, or the memory controller 250 to the display 350 according to the control of the CPU 210.

A mobile industry processor interface (MIPI®), a display serial interface (DSI), an embedded DisplayPort (eDP), or a high-definition multimedia interface (HDMI) may be connected between the display controller 260 and the display 350, but the inventive concept is not restricted thereto.

The display 350 may be a device that can display data and may include a display panel and a controller that controls the operation of the display panel. The display 350 may or may not include a backlight unit controlled by the controller.

The display 350 may be implemented as a flat panel display. The flat panel display may be a thin film transistor liquid crystal display (TFT-LCD), a light emitting diode (LED) display, organic LED (OLED) display, an active matrix OLED (AMOLED) display, a flexible display, a double sided display, or a transparent display.

Although it is illustrated in FIG. 1 that the first temperature sensor TS1 is placed near the CPU 210, the second temperature sensor TS2 is placed near the first function block 230, the third temperature sensor TS3 is placed near the second function block 240, the fourth temperature sensor TS4 is placed near the memory controller 250, and the fifth temperature sensor TS5 is placed near the display controller 260, the inventive concept is not restricted thereto. For example, the temperature sensor TS4 may be placed closer to the bus between the memory controller 250 and the memory 300.

In an exemplary embodiment of the inventive concept, the computing systems 100A, 100B, 100C, and 100D may also include a temperature sensor that senses a temperature of the memory 300 and/or the display 350. The temperature sensors TS1 through TS5 may be embedded in the function blocks 210, 230, 240, 250, and 260, respectively, in an exemplary embodiment of the inventive concept. When each of the function blocks 210, 230, 240, 250, and 260 is implemented as a chip, the temperature sensors TS1 through TS5 may be integrated into the function blocks 210, 230, 240, 250, and 260, respectively.

When a chip corresponding to each of the function blocks 210, 230, 240, 250, and 260 is packaged into a package, each of the temperature sensors TS1 through TS5 may be embedded in the package corresponding to one of the function blocks 210, 230, 240, 250, and 260. In an exemplary embodiment of the inventive concept, each of the temperature sensors TS1 through TS5 may be embedded in a printed circuit board (PCB) of the chip corresponding to one of the function blocks 210, 230, 240, 250, and 260.

As described above, the temperature sensors TS1 through TS5 may be positioned in any place inside or outside the function blocks 210, 230, 240, 250, and 260, respectively, to measure the temperatures of the respective function blocks 210, 230, 240, 250, and 260.

Although the operating voltages PW1 through PW8 generated by the PMIC 110A are respectively applied to the function blocks 210, 260, 220, 230, 240, 250, 300, and 350 as illustrated in FIG. 1, this is just an example. In other words, at least two of the operating voltages PW1 through PW8 may be the same. In addition, as shown in FIG. 1, the seventh and eighth operating voltages PW7 and PW8 may be directly applied to the memory 300 and display 350 from the PMIC 110A. The first to sixth operating voltages PW1 to PW6 may be directly applied to the power management unit 205 from the PMIC 110A. The power management unit 205 may then provide the operating voltages PW1 to PW6 to their respective function blocks 210, 260, 220, 230, 240 and 250.

The first operating voltage PW1 may be applied to a first power domain including the CPU 210. The second operating voltage PW2 may be applied to a second power domain including the display controller 260. The third operating voltage PW3 may be applied to a third power domain including the power estimation circuit 220. The fourth operating voltage PW4 may be applied to a fourth power domain including the first function block 230. The fifth operating voltage PW5 may be applied to a fifth power domain including the second function block 240. The sixth operating voltage PW6 may be applied to a sixth power domain including the memory controller 250. The seventh operating voltage PW7 may be applied to a seventh power domain including the memory 300. The eighth operating voltage PW8 may be applied to the display 350.

Figure 2:
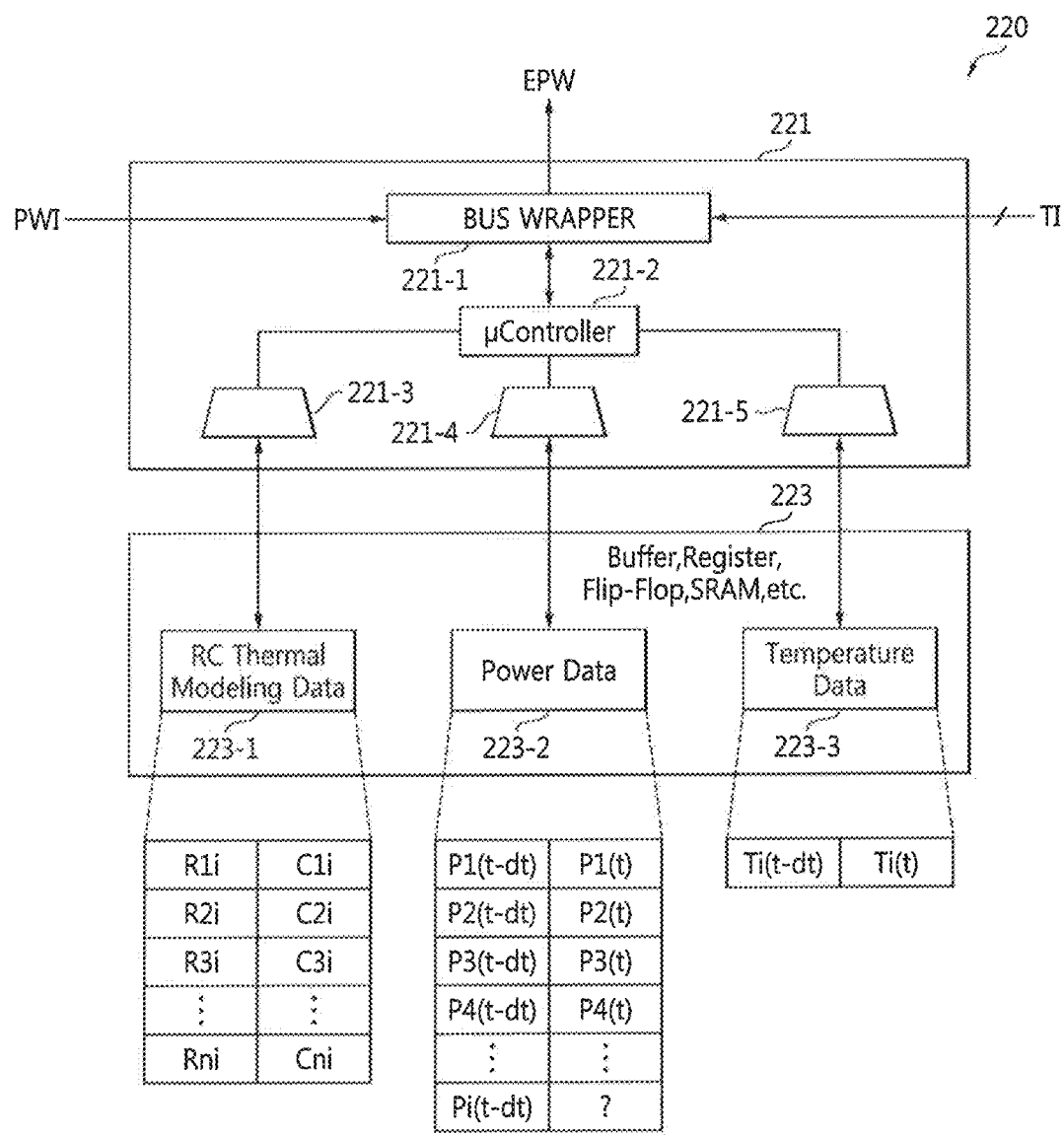
FIG. 2 is a block diagram of a power estimation circuit illustrated in FIG. 1, according to an exemplary embodiment of the inventive concept.

FIG. 2 is a block diagram of the power estimation circuit 220 illustrated in FIG. 1, according to an exemplary embodiment of the inventive concept. Referring to FIG. 2, the power estimation circuit 220 may include a power estimation manager circuit 221 and a buffer 223. The operation of the power estimation manager circuit 221 may be controlled by the CPU 210.

The power estimation manager circuit 221 may receive the power data PWI about the operating voltages PW1 through PW8 and temperature data TI and may store the power data PWI and the temperature data TI. In an exemplary embodiment of the inventive concept, the power estimation manager circuit 221 may store the power data PWI and the temperature data TI in the buffer 223 according to the control of the CPU 210. As shown in FIG. 2, the power estimation manager circuit 221 includes a bus wrapper 221-1 configured to receive the power data PWI and the temperature data T1. The power estimation manager circuit 221 further includes a plurality of de-multiplexers 221-3, 221-4 and 221-5 connected to the buffer 223 and a microcontroller 221-2 configured to exchange data between the de-multiplexers 221-3, 221-4 and 221-5 and the bus wrapper 221-1. The power estimation manager circuit 221 may also output estimated power EPW (to be described in detail later with reference to FIG. 4A) to the power management unit 205.

The power data PWI may be read (or fetched) from the storage device REG in the PMIC 110A. The temperature data TI may include temperature data TI1 through TI5 output from at least one of the temperature sensors TS1 through TS5.

The buffer 223 may include a first region 223-1 storing RC thermal modeling data, a second region 223-2 storing the power data PWI, and a third region 223-3 storing the temperature data TI. For example, the buffer 223 may be a register but is not restricted thereto. For example, the buffer 223 may be a flip-flop or a static random access memory (SRAM).

In an exemplary embodiment of the inventive concept, the RC thermal modeling data may be stored in a translation lookaside buffer (TLB) and the power data PWI and the temperature data TI may be stored in the buffer 223. In this case, the first region 223-1 (for example, the TLB) storing the RC thermal modeling data may be separated from the regions 223-2 and 223-3 storing the power data PWI and the temperature data TI.

Figure 3:
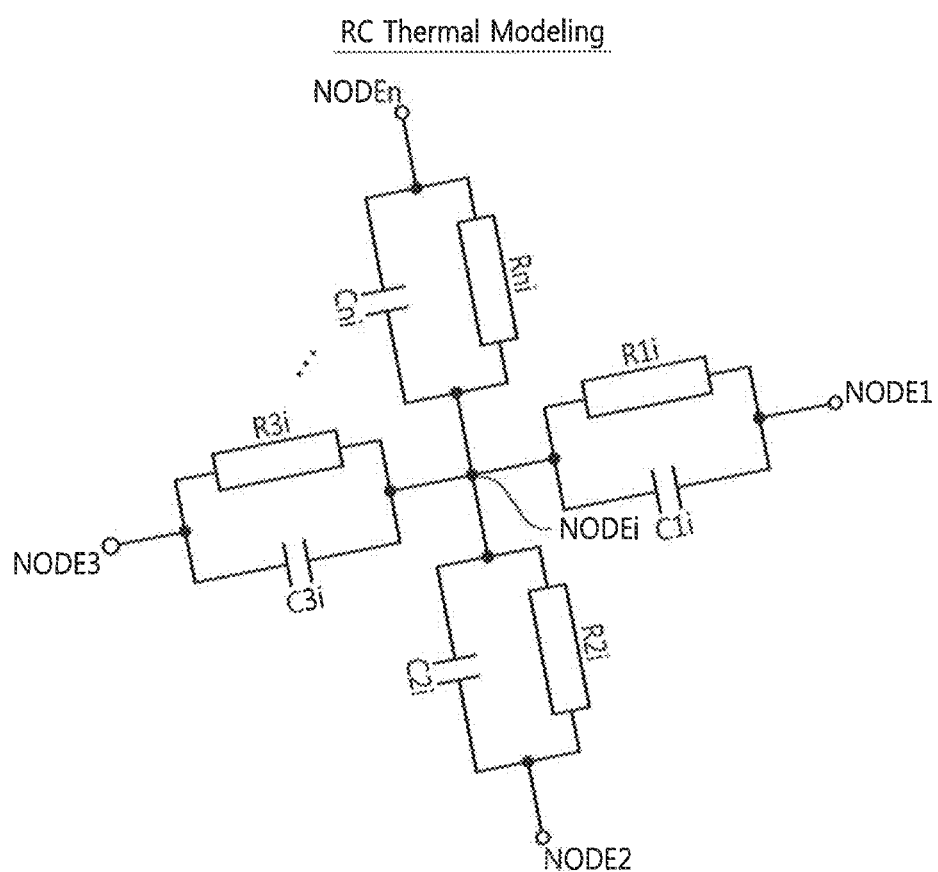
FIG. 3 is a diagram for explaining resistive-capacitive (RC) thermal modeling, according to an exemplary embodiment of the inventive concept.

FIG. 3 is a diagram for explaining RC thermal modeling, according to an exemplary embodiment of the inventive concept. Referring to FIG. 3, a node NODEi targeted for estimation of a power consumption may be connected to a plurality of nodes NODE1 through NODEn, where "n" is a natural number of at least 2. In this case, the node NODEi may be a node whose power consumption might not be estimated by prior techniques, a node whose power consumption might not be estimated with high accuracy, or a node whose power consumption estimate is complicated to obtain.

A reference character R1$i$ denotes a modeling resistance between the nodes NODE1 and NODEi. A reference character C1$i$ denotes a modeling capacitance between the nodes NODE1 and NODEi.

A reference character R2$i$ denotes a modeling resistance between the nodes NODE2 and NODEi. A reference character C2$i$ denotes a modeling capacitance between the nodes NODE2 and NODEi.

A reference character R3$i$ denotes a modeling resistance between the nodes NODE3 and NODEi. A reference character C3$i$ denotes a modeling capacitance between the nodes NODE3 and NODEi.

A reference character Rn$i$ denotes a modeling resistance between the nodes NODEn and NODEi. A reference character Cn$i$ denotes a modeling capacitance between the nodes NODEn and NODEi.

Figure 4A:
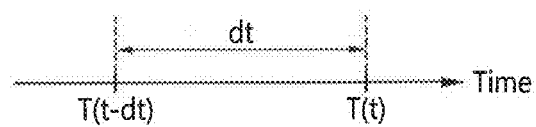
FIG. 4A shows an equation for explaining a method of estimating a power consumption of a first node using the power estimation circuit illustrated in FIG. 2, according to an exemplary embodiment of the inventive concept.

FIG. 4A shows an equation for explaining a method of estimating a power consumption of a first node using the power estimation circuit 220 illustrated in FIG. 2, according to exemplary embodiment of the inventive concept. Referring to FIGS. 3 and 4A, it is assumed that a first time point T(t−dt) is a previous time point, a second time point T(t) is a current time point, and there is a time difference "dt" between the first time point T(t−dt) and the second time point T(t). It is also assumed that an initial temperature of the node NODEi is a room temperature and an initial power of the node NODEi is zero.

For ease of description, it is assumed that the first node, e.g., node NODEi, is the first function block 230 and a plurality of second nodes, e.g., NODE1 through NODEn (where n=4), are the CPU 210, the second function block 240, the memory controller 250, and the display controller 260, respectively.

In the equation illustrated in FIG. 4A, it is assumed that Ti(t) is a temperature of the first function block 230 measured by the temperature sensor TS2 at the second time point T(t), P1(t) is a power of the CPU 210 measured (or estimated) at the second time point T(t), P1(t−dt) is a power of the CPU 210 measured (or estimated) at the first time point T(t−dt), and Ti(t−dt) is a temperature of the first function block 230 measured by the temperature sensor TS2 at the first time point T(t−dt).

It is also assumed that P2(t) is a power of the second function block 240 measured (or estimated) at the second time point T(t), P2(t−dt) is a power of the second function block 240 measured (or estimated) at the first time point T(t−dt), and Pi(t−dt) is a power estimated by the power estimation circuit 220 at the first time point T(t−dt).

Accordingly, only Pi(t) is an unknown value in the equation illustrated in FIG. 4A. As shown in FIG. 4A, the power estimation circuit 220 may calculate the unknown value Pi(t) using the known values. In other words, the power estimation circuit 220 may estimate (or calculate) a power consumed in the first function block 230 at the second time point T(t) and may generate an estimated power EPW (=Pi(t)).

As shown in FIG. 2, the first region 223-1 of the buffer 223 stores the RC thermal modeling data R1$i$ through Rn$i$ and C1$i$ through Cn$i$; the second region 223-2 of the buffer 223 stores the power data P1(t−dt) through Pi(t−dt), and P1(t) through P4(t) . . . ; and the third region 223-3 of the buffer 223 stores the temperatures Ti(t−dt) and Ti(t).

The temperature sensor TS2 may measure the temperatures Ti(t−dt) and Ti(t) of the first node 230 at different time points including the first time point T(t−dt) and the second time point T(t).

The power estimation manager circuit 221 may receive the temperature data TI, e.g., the temperatures Ti(t−dt) and Ti(t) of the first node 230, from the temperature sensor TS2 and may store the temperatures Ti(t−dt) and Ti(t) in the third region 223-3 of the buffer 223.

The PMIC 110A may measure (or calculate) powers of each of the second nodes 210, 240, 250, and 260 connected to the first node 230 at different time points including the first time point T(t−dt) and the second time point T(t) and may store the power data PWI corresponding to the measurement result in the storage device REG.

The power estimation manager circuit 221 may read the power data PWI from the storage device REG and may store the power data PWI that has been read in the second region 223-2 of the buffer 223.

The power estimation manager circuit 221 may receive and store the RC thermal modeling data R1$i$ through R4$i$ and C1$i$ through C4$i$ in the first region 223-1 of the buffer 223.

The power estimation manager circuit 221 may estimate a power consumption of the first node 230 at the second time point T(t) using the RC thermal modeling data R1$i$ through R4$i$ and C1$i$ through C4$i$ between the each of the second nodes 210, 240, 250, and 260 and the first node 230, the temperatures Ti(t−dt) and Ti(t) of the first node 230 measured at the time points T(t−dt) and T(t), the powers P1(t−dt) through P4(t−dt) and P1(t) through P4(t) of the second nodes 210, 240, 250, and 260 measured at the time points T(t−dt) and T(t), and the power Pi(t−dt) of the first node 230 estimated by the power estimation manager circuit 221 at the first time point T(t−dt), and thus, the power estimation manager circuit 221 may generate the estimated power consumption EPW(=Pi(t)).

Figure 4C:
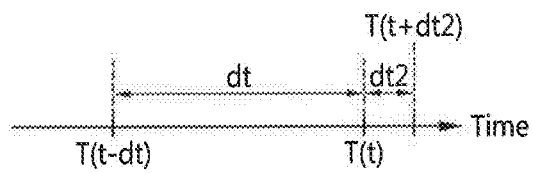
Figure 5:
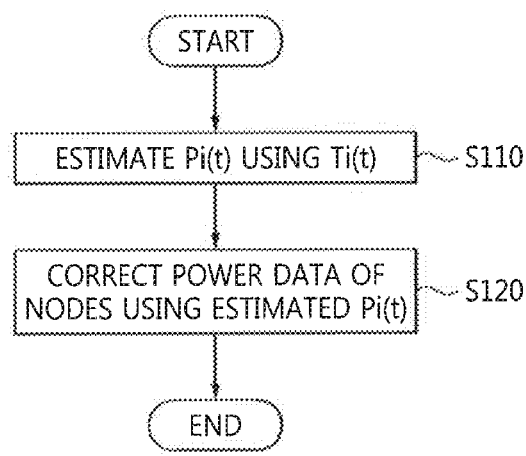
FIG. 5 is a flowchart of the method of compensating power data of a second node using the power estimation circuit illustrated in FIG. 2, according to an exemplary embodiment of the inventive concept.

FIGS. 4B and 4C show equations for explaining a method of correcting power data of the second nodes using the power estimation circuit 220 illustrated in FIG. 2, according to an exemplary embodiment of the inventive concept. FIG. 5 is a flowchart of the method of correcting the power data of each of the second nodes using the power estimation circuit 220 illustrated in FIG. 2, according to an exemplary embodiment of the inventive concept.

Referring to FIGS. 1 through 5, the power estimation manager circuit 221 may estimate the power consumption Pi(t) of the first node 230 at the current (or second) time point T(t) using the temperature Ti(t) of the first node 230 measured at the second time point T(t), RC thermal modeling data stored in the first region 223-1, power data stored in the second region 223-2, and thermal data stored in the third region 223-3, as described with reference to FIGS. 3 and 4A, in operation S110.

The power estimation manager circuit 221 may correct the power data P1(t) through P4(t) of the respective second nodes 210, 240, 250, and 260 using the power consumption Pi(t) estimated for the first node 230 in operation S120.

Referring to FIG. 4B, the power estimation manager circuit 221 may correct the power P1(t), which had been measured for the CPU 210 at the second time point T(t), at a third time point T(t+dt1). It is assumed that a time difference "dt1" is much shorter than the time difference "dt". Since the time difference "dt1" is very short, the power estimation manager circuit 221 may use data that had been used at the second time point T(t) at the third time point T(t+dt1).

In other words, when P1(t) is set as an unknown value by the power estimation manager circuit 221 at the third time point T(t+dt1), the power estimation manager circuit 221 may calculate a power P1'(t) using the equation illustrated in FIG. 4B. In this case, the power P1(t) may be corrected or changed to the power P1'(t). The power estimation manager circuit 221 may update the power P1(t) stored in the buffer 223 with the power P1'(t).

Referring to FIG. 4C, the power estimation manager circuit 221 may correct the power P2(t), which had been measured for the second function block 240 at the second time point T(t), at a fourth time point T(t+dt2). It is assumed that a time difference "dt2" is much shorter than the time difference "dt". Since the time difference "dt2" is very short, the power estimation manager circuit 221 may use data that had been used at the second time point T(t) at the fourth time point T(t+dt2).

In other words, when P2(t) is set as an unknown value by the power estimation manager circuit 221 at the fourth time point T(t+dt2), the power estimation manager circuit 221 may calculate a power P2'(t) using the equation illustrated in FIG. 4C. In this case, the power P2(t) may be corrected or changed to the power P2'(t). The power estimation manager circuit 221 may update the power P2(t) stored in the buffer 223 with the power P2'(t).

As described above with reference to FIGS. 4B and 4C, the power estimation manager circuit 221 may correct the power P3(t) of the memory controller 250 at a time point different from the fourth time point T(t+dt2) using a method the same as or similar to the method of correcting the power P1(t) or P2(t) to the power P1'(t) or P2'(t). In addition, the power estimation manager circuit 221 may correct the power P4(t) of the display controller 260 at another time point different from the fourth time point T(t+dt2) using a method the same as or similar to the method of correcting the power P1(t) or P2(t) to the power P1'(t) or P2'(t).

As described above with reference to FIGS. 4A through 4C, the power estimation manager circuit 221 may correct or change the power data P1(t) through P4(t) of the respective second nodes 210, 240, 250, and 260 measured at the second time point T(t) using the estimated power Pi(t). Therefore, the power data P1(t) through P4(t) measured or estimated for the second nodes 210, 240, 250, and 260, respectively, may be made more accurate.

Figure 6:
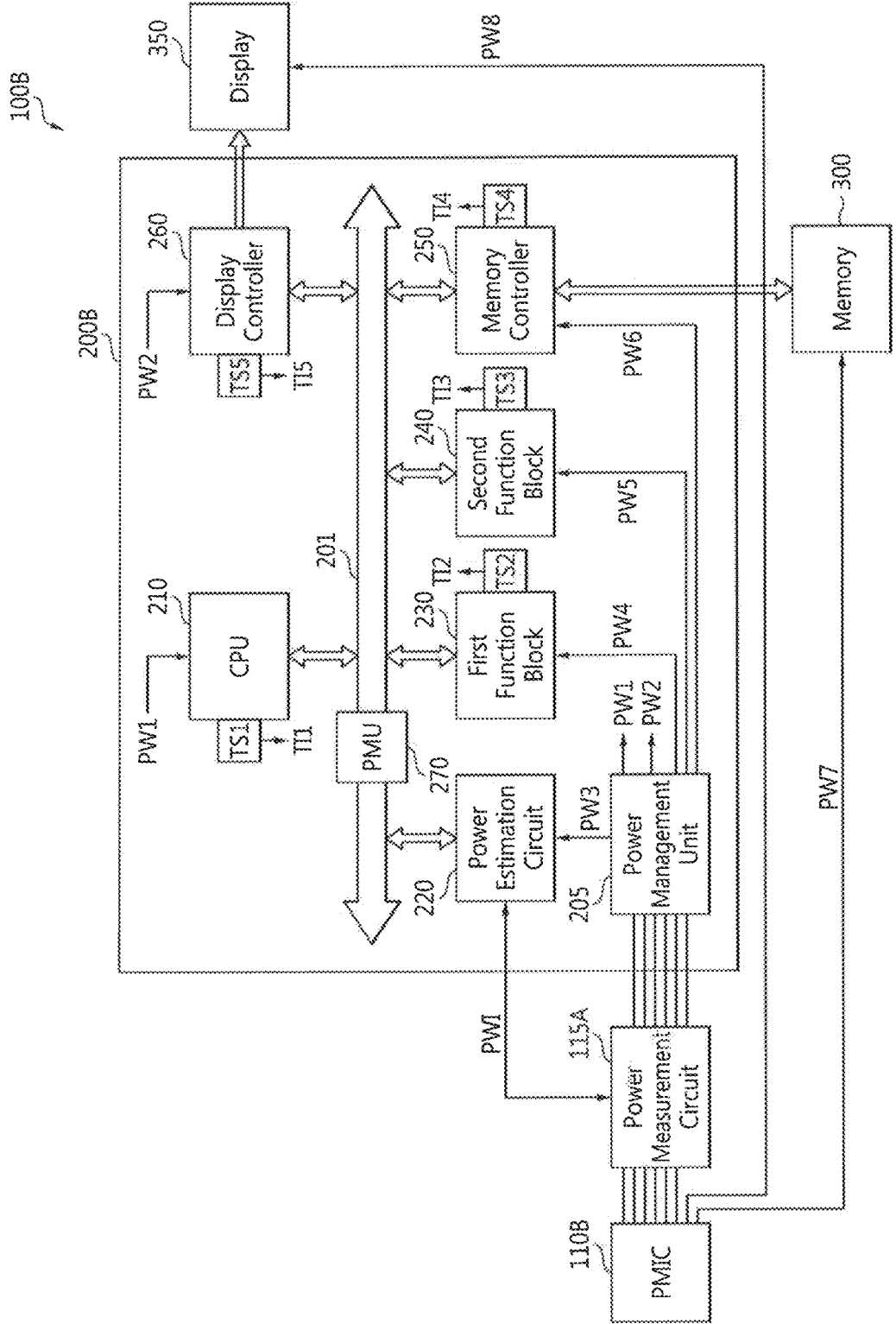
FIG. 6 is a block diagram of a computing system according to an exemplary embodiment of the inventive concept.

FIG. 6 is a block diagram of the computing system 100B according to an exemplary embodiment of the inventive concept. Referring to FIG. 6, the computing system 100B may include a PMIC 110B, a power measurement circuit 115A, an IC 200B, the memory 300, and the display 350. As described above, the PMIC 110B, the IC 200B, the memory 300, and the display 350 may be nodes as system components.

The PMIC 110B may generate the operating voltages PW1 through PW8 applied to the IC 200B, the memory 300, and the display 350.

The power measurement circuit 115A placed between the PMIC 110B and the IC 200B may measure (or estimate or calculate) a power corresponding to each of the operating voltages PW1 through PW6 output from the PMIC 110B and may generate the power data PWI according to the measurement result. The power estimation circuit 220 may use the power data PWI to estimate a power of the first node 230.

The operations and structure of the IC 200B illustrated in FIG. 6 are the same as or similar to those of the IC 200A illustrated in FIG. 1. Thus, detailed descriptions of the operations and structure of the IC 200B will be omitted.

Figure 7:
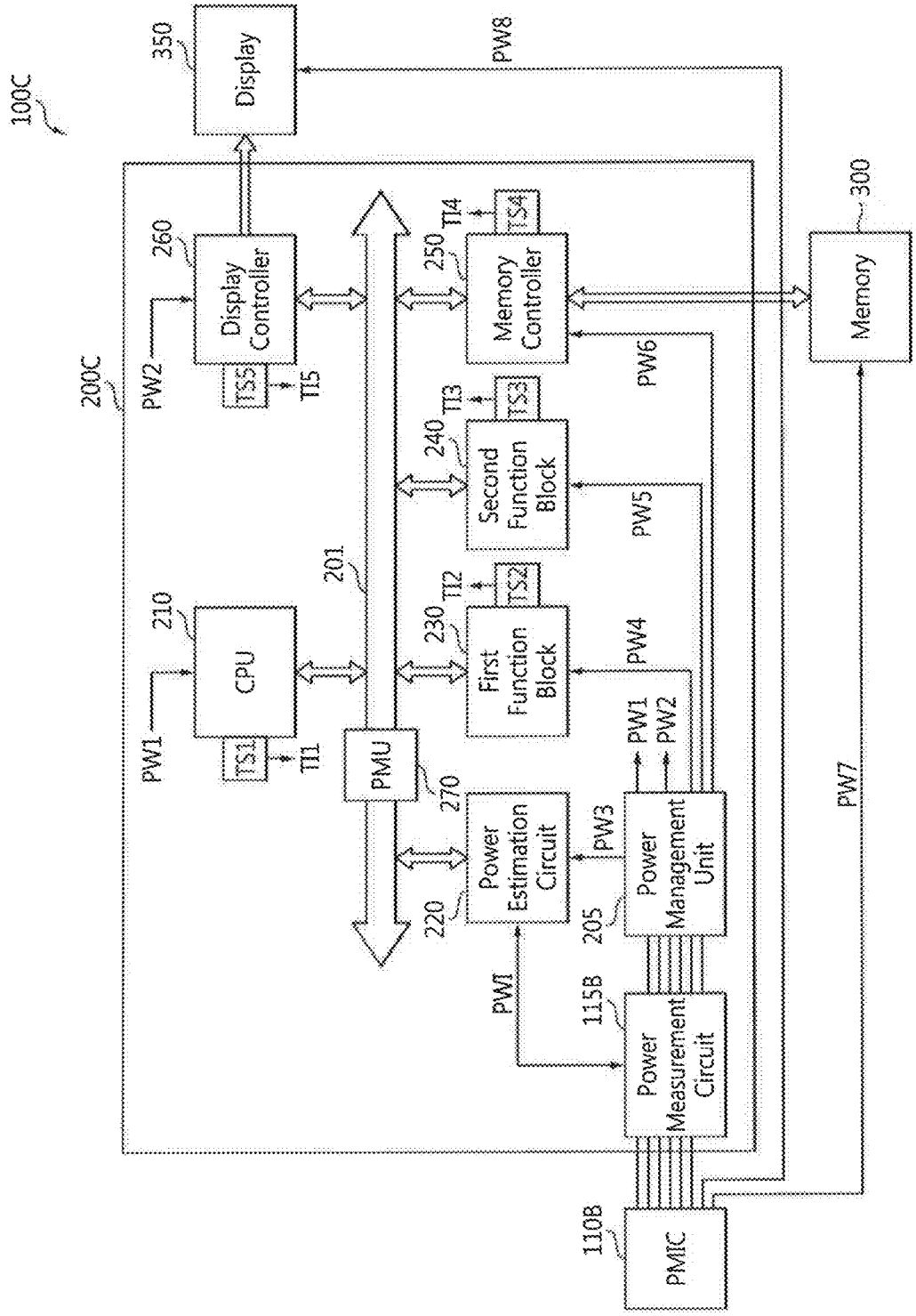
FIG. 7 is a block diagram of a computing system according to an exemplary embodiment of the inventive concept.

FIG. 7 is a block diagram of a computing system 100C according to an exemplary embodiment of the inventive concept. Referring to FIG. 7, the computing system 100C may include the PMIC 110B, a power measurement circuit 115B, an IC 200C, the memory 300, and the display 350. As described above, the PMIC 110B, the IC 200C, the memory 300, and the display 350 may be nodes as system components.

The PMIC 110B may generate the operating voltages PW1 through PW8 applied to the IC 200C, the memory 300, and the display 350.

The power measurement circuit 115B integrated into or placed in the IC 200C may measure (or estimate or calculate) a power corresponding to each of the operating voltages PW1 through PW6 output from the PMIC 110B and may generate the power data PWI according to the measurement result. The power estimation circuit 220 may use the power data PW1 to estimate a power of the first node 230.

Apart from the position of the power measurement circuit 115B, the operations and structure of the IC 200C illustrated in FIG. 7 are the same as or similar to those of the IC 200B illustrated in FIG. 6. Thus, detailed descriptions of the operations and structure of the IC 200C will be omitted.

Figure 8:
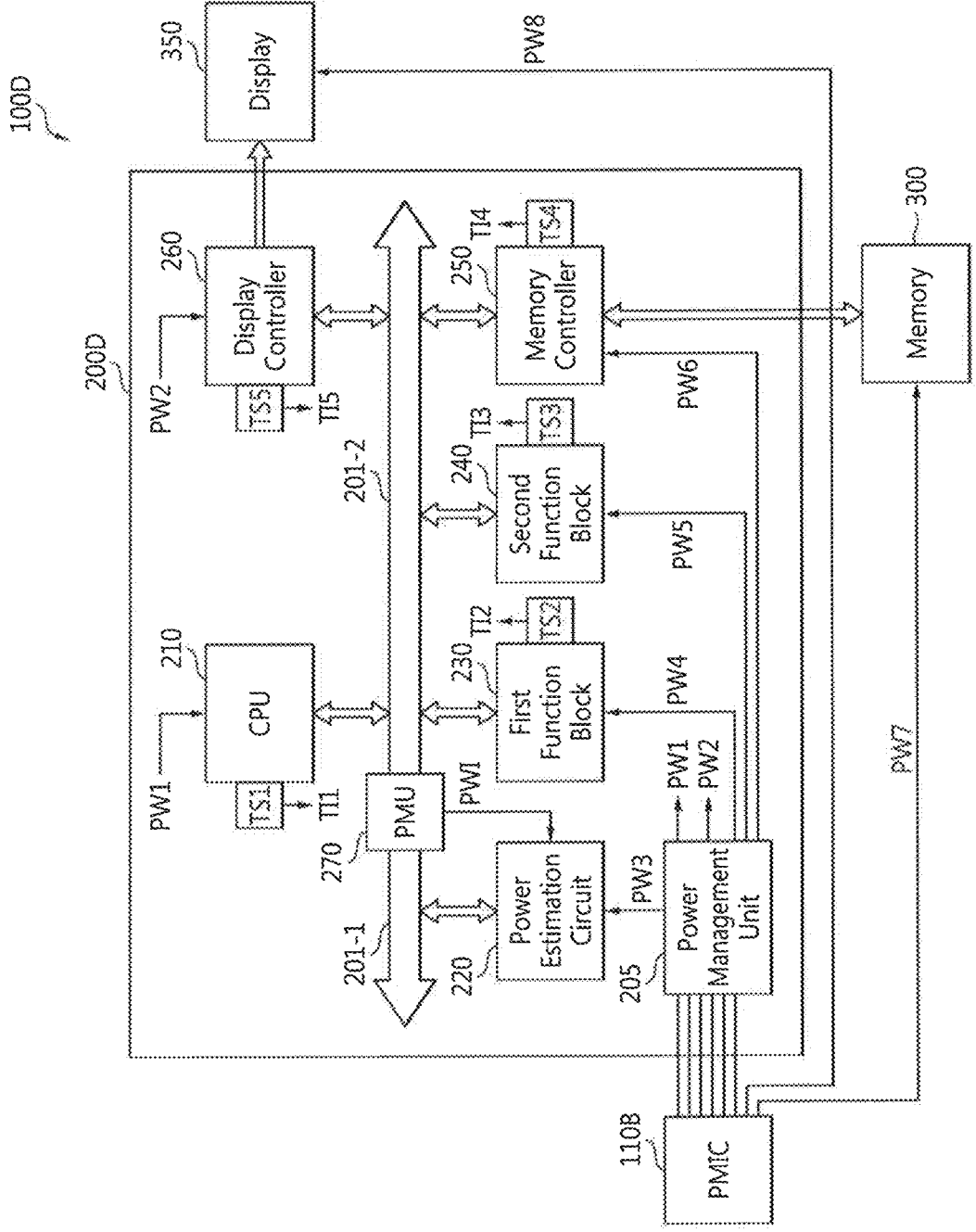
FIG. 8 is a block diagram of a computing system according to an exemplary embodiment of the inventive concept.

FIG. 8 is a block diagram of a computing system 100D according to an exemplary embodiment of the inventive concept. Referring to FIG. 8, the computing system 100D may include the PMIC 110B, an IC 200D, the memory 300, and the display 350. As described above, the PMIC 110B, the IC 200D, the memory 300, and the display 350 may be nodes as system components.

The PMIC 110B may generate the operating voltages PW1 through PW8 applied to the IC 200D, the memory 300, and the display 350.

A PMU 270 may be connected to bus architectures 201-1 and 201-2, but the position of the PMU 270 may vary. The bus architectures 201-1 and 201-2 illustrated in FIG. 8 are the same as or similar to the bus architecture 201 illustrated in FIG. 1.

The PMU 270 may monitor bus traffic or data traffic between the first node 230 and each of the second nodes 210, 240, 250, and 260 and may generate the power data PWI for each of the second nodes 210, 240, 250, and 260 based on the monitoring result. The power estimation circuit 220 may use the power data PWI to estimate a power of the first node 230. The rest of the components of the IC 200D are the same as or similar to those of the IC 200A of FIG. 1. Thus, detailed descriptions of the operations and structure of the IC 200D will be omitted.

FIG. 9 is a flowchart of an operation of the computing system 100A, 100B, 100C, or 100D illustrated in FIG. 1, 6, 7, or 8 according to an exemplary embodiment of the inventive concept. Referring to FIGS. 1 through 9, the temperature sensor TS2 may measure the temperatures Ti(t−dt) and Ti(t) of the first node 230 at different time points including the first time point T(t−dt) and the second time point T(t) in operation S210.

As an example, the PMIC 110A illustrated in FIG. 1, the power measurement circuit 115A illustrated in FIG. 6, the power measurement circuit 115B illustrated in FIG. 7, or the PMU 270 illustrated in FIG. 8 may measure (or estimate) powers of each of the second nodes 210, 240, 250, and 260 connected to the first node 230 at the different time points including the first time point T(t−dt) and the second time point T(t) and may generate the power data PWI corresponding to the measurement result in operation S220. As another example, the PMU 270 illustrated in each of FIGS. 1 and 6-8 can perform this operation.

The power estimation circuit 220, and more particularly, the power estimation manager circuit 221 may estimate a runtime power consumption of the first node 230 at the second time point T(t) using the RC thermal modeling data R1i through R4i and C1i through C4i between the first node 230 and the second nodes 210, 240, 250, and 260, the temperatures Ti(t−dt) and Ti(t) of the first node 230 measured at the different time points, the powers P1(t−dt) through P4(t−dt) and P1(t) through P4(t) of the second nodes 210, 240, 250, and 260 measured at the different time points, and the power Pi(t−dt) of the first node 230 estimated by the power estimation circuit 220 at the first time point T(t−dt), and thus, may output the estimated power consumption Pi(t) in operation S230.

As described above with reference to FIGS. 4B and 4C, the power estimation circuit 220, and more particularly, the power estimation manager circuit 221 may correct the power data P1(t) through P4(t) for the respective second nodes 210, 240, 250, and 260 using the estimated power consumption Pi(t) of the first node 230 in operation S240.

As described above with reference to FIGS. 1 through 9, data about the power consumption Pi(t) estimated by the power estimation circuit 220 for the first node 230 and/or corrected power data for the second nodes 210, 240, 250, and 260 may be stored in the buffer 223.

The CPU 210 may transmit the data stored in the buffer 223 to the PMIC 110A or 110B in an exemplary embodiment of the inventive concept. Accordingly, the PMIC 110A or 110B may control the operating voltages PW1 through PW8 using that data.

The CPU 210 may transmit the data stored in the buffer 223 to a clock management unit included in the IC 200A, 200B, 200C, or 200D in an exemplary embodiment of the inventive concept. Accordingly, the clock management unit may control a frequency of a clock signal applied to each of the nodes 210, 230, 240, 250, and 260 using that data.

As described above, the data about the power consumption Pi(t) estimated for the first node 230 and/or the corrected power data for the second nodes 210, 240, 250, and 260 may be used for power management of the computing system 100A, 100B, 100C, or 100D.

The computing system 100A, 100B, 100C, or 100D can accurately estimate the runtime power consumption of the first node 230 using a method of estimating a power consumption according to an exemplary embodiment of the inventive concept. In addition, the computing system 100A, 100B, 100C, or 100D can accurately estimate the overall power consumption of the IC 200A, 200B, 200C, or 200D using a method of estimating a power consumption and/or a method of correcting power data according to an exemplary embodiment of the inventive concept. Moreover, the computing system 100A, 100B, 100C, or 100D can accurately control its skin temperature using the method of estimating a power consumption and/or the method of correcting power data according to an exemplary embodiment of the inventive concept.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims.

What is claimed is:

1. A power estimation circuit, comprising:
   a power estimation manager circuit configured to receive power data and temperature data; and
   a storage circuit that includes a first region storing resistive-capacitive (RC) thermal modeling data, a second region storing the power data and a third region storing the temperature data,
   wherein the power estimation manager circuit is configured to estimate power consumption of a first node at a second time point, which occurs after a first time point, using an equation given by:

$$Ti(t) = \left[\frac{R1idt}{2R1iC1i+dt}[P1(t)+P1(t-dt)] + \frac{2R1iC1i-dt}{2R1iC1i+dt}*Ti(t-dt)\right] +$$
$$\left[\frac{R2idt}{2R2iC2i+dt}[P2(t)+P2(t-dt)] + \frac{2R2iC2i-dt}{2R2iC2i+dt}*Ti(t-dt)\right] + \ldots +$$
$$\left[\frac{Rnidt}{2RniCni+dt}\left[\underbrace{\boxed{Pi(t)}}_{EPW}+Pi(t-dt)\right] + \frac{2RniCni-dt}{2RniCni+dt}*Ti(t-dt)\right],$$

wherein Ti(t) is a temperature of the first node at the second time point, P1(t) is a power of a second node at the second time point, P1(t−dt) is a power of the second node at the first time point, P2(t) is a power of a third node at the second time point, P2(t−dt) is a power of the third node at the first time point, Pi(t−dt) is a power of the first node at the first time point, and Pi(t) is the estimated power consumption of the first node at the second time point,
   Ti(t−dt) is a temperature of the first node at the first time point, and dt is a time difference between the first time point and the second time point,
   R1i is a modeling resistance between the first node and the second node, R2i is a modeling resistance between the first node and the third node, and Rni is a modeling resistance between the first node and an nth node,
   C1i is a modeling capacitance between the first node and the second node, C1i−dt is the modeling capacitance between the first node and the second node minus the time difference between the first time point and the second time point, C1i+dt is the modeling capacitance between the first node and the second node plus the time difference between the first time point and the second time point,
   C2i is a modeling capacitance between the first node and the third node, C2i−dt is the modeling capacitance between the first node and the third node minus the time difference between the first time point and the second time point, C2i+dt is the modeling capacitance between the first node and the third node plus the time difference between the first time point and the second time point, and Cni is a modeling capacitance between the first node and the nth node, Cni−dt is the modeling capacitance between the first node and the nth node minus the time difference between the first time point and the second time point, Cni+dt is the modeling capacitance between the first node and the nth node plus the time difference between the first time point and the second time point, wherein the estimated power consumption of the first node at the second time point is an unknown in the equation.

2. The power estimation circuit of claim 1, wherein the power estimation manager circuit is configured to correct the power of at least one of the second and third nodes by using the estimated power consumption of the first node at the second time point.

3. The power estimation circuit of claim 1, wherein the storage circuit includes a buffer, a register, a flip-flop or a random access memory.

4. The power estimation circuit of claim 1, wherein the first and second nodes include a system component, a function block which is included in a system component, a function component which is included in a function block, or a circuit element which is included in a function component.

5. An application processor, comprising:
a plurality of nodes;
a plurality of temperature sensors;
a power estimation circuit including:
a power estimation manager circuit configured to receive power data and temperature data for the nodes; and
a storage circuit that includes a first region storing resistive-capacitive (RC) thermal modeling data for the nodes, a second region storing the power data and a third region storing the temperature data,
wherein the power estimation manager circuit is configured to estimate power consumption of a first node at a second time point, which occurs after a first time point, using an equation given by:

$$Ti(t) = \left[\frac{R1idt}{2R1iC1i+dt}[P1(t)+P1(t-dt)] + \frac{2R1iC1i-dt}{2R1iC1i+dt}*Ti(t-dt)\right] +$$
$$\left[\frac{R2idt}{2R2iC2i+dt}[P2(t)+P2(t-dt)] + \frac{2R2iC2i-dt}{2R2iC2i+dt}*Ti(t-dt)\right] + \ldots +$$
$$\left[\frac{Rnidt}{2RniCni+dt}\left[\underbrace{Pi(t)}_{EPW}+Pi(t-dt)\right] + \frac{2RniCni-dt}{2RniCni+dt}*Ti(t-dt)\right],$$

wherein Ti(t) is a temperature of the first node at the second time point, P1(t) is a power of a second node at the second time point, P1(t−dt) is a power of the second node at the first time point, P2(t) is a power of a third node at the second time point, P2(t−dt) is a power of the third node at the first time point, Pi(t−dt) is a power of the first node at the first time point, and Pi(t) is the estimated power consumption of the first node at the second time point, Ti(t−dt) is a temperature of the first node at the first time point, and dt is a time difference between the first time point and the second time point, R1i is a modeling resistance between the first node and the second node, R2i is a modeling resistance between the first node and the third node, and Rni is a modeling resistance between the first node and an nth node, C1i is a modeling capacitance between the first node and the second node, C1i−dt is the modeling capacitance between the first node and the second node minus the time difference between the first time point and the second time point, C1i+dt is the modeling capacitance between the first node and the second node plus the time difference between the first time point and the second time point, C2i is a modeling capacitance between the first node and the third node, C2i−dt is the modeling capacitance between the first node and the third node minus the time difference between the first time point and the second time point, C2i+dt is the modeling capacitance between the first node and the third node plus the time difference between the first time point and the second time point, and Cni is a modeling capacitance between the first node and the nth node, Cni−dt is the modeling capacitance between the first node and the nth node minus the time difference between the first time point and the second time point, Cni+dt is the modeling capacitance between the first node and the nth node plus the time difference between the first time point and the second time point, wherein the estimated power consumption of the first node at the second time point is an unknown in the equation, wherein the application processor further comprises:
a power management unit configured to provide the power data to the power estimation circuit; and
a power monitoring unit configured to monitor traffic flow between each of the first to nth nodes.

6. The application processor of claim 5, wherein at least one of the temperature sensors is used to measure temperatures of the first node at the first and second time points.

7. The application processor of claim 5, wherein the power estimation manager circuit is configured to correct the power of at least one of the second and third nodes by using the estimated power consumption of the first node at the second time point.

8. The application processor of claim 5, wherein at least one of the temperature sensors is used to measure temperatures of the first node at different time points.

9. The application processor of claim 5, wherein the storage circuit includes a buffer, a register, a flip-flop or a random access memory.

10. The application processor of claim 5, wherein the first and second nodes include a system component, a function block which is included in a system component, a function component which is included in a function block, or a circuit element which is included in a function component.

11. The application processor of claim 5, wherein the estimated power consumption of the first node at the second time point is provided to the power management unit from the power estimation circuit.

12. The application processor of claim 5, wherein the powers of the first, second and third nodes are provided to the power estimation circuit from the power monitoring unit.

13. A mobile system, comprising:
an application processor including a plurality of nodes and a power estimation circuit, the power estimation circuit including:
a power estimation manager circuit configured to receive power data and temperature data for the nodes; and
a storage circuit that includes a first region storing resistive-capacitive (RC) thermal modeling data for the nodes, a second region storing the power data and a third region storing the temperature data, wherein the power estimation manager circuit is configured to estimate power consumption of a first node at a second time point, which occurs after a first time point, using an equation given by:

$$Ti(t) = \left[\frac{R1idt}{2R1iC1i+dt}[P1(t)+P1(t-dt)] + \frac{2R1iC1i-dt}{2R1iC1i+dt}*Ti(t-dt)\right] +$$
$$\left[\frac{R2idt}{2R2iC2i+dt}[P2(t)+P2(t-dt)] + \frac{2R2iC2i-dt}{2R2iC2i+dt}*Ti(t-dt)\right] + \ldots +$$
$$\left[\frac{Rnidt}{2RniCni+dt}\left[\underbrace{\boxed{Pi(t)}}_{EPW}+Pi(t-dt)\right] + \frac{2RniCni-dt}{2RniCni+dt}*Ti(t-dt)\right],$$

wherein Ti(t) is a temperature of the first node at the second time point, P1(t) is a power of a second node at the second time point, P1(t–dt) is a power of the second node at the first time point, P2(t) is a power of a third node at the second time point, P2(t–dt) is a power of the third node at the first time point, Pi(t–dt) is a power of the first node at the first time point, and Pi(t) is the estimated power consumption of the first node at the second time point, Ti(t–dt) is a temperature of the first node at the first time point, and dt is a time difference between the first time point and the second time point, R1$i$ is a modeling resistance between the first node and the second node, R2$i$ is a modeling resistance between the first node and the third node, and Rni is a modeling resistance between the first node and an nth node, C1$i$ is a modeling capacitance between the first node and the second node, C1$i$–dt is the modeling capacitance between the first node and the second node minus the time difference between the first time point and the second time point, C1$i$+dt is the modeling capacitance between the first node and the second node plus the time difference between the first time point and the second time point, C2$i$ is a modeling capacitance between the first node and the third node, C2$i$–dt is the modeling capacitance between the first node and the third node minus the time difference between the first time point and the second time point, C2$i$+dt is the modeling capacitance between the first node and the third node plus the time difference between the first time point and the second time point, and Cni is a modeling capacitance between the first node and the nth node, Cni–dt is the modeling capacitance between the first node and the nth node minus the time difference between the first time point and the second time point, Cni+dt is the modeling capacitance between the first node and the nth node plus the time difference between the first time point and the second time point, wherein the estimated power consumption of the first node at the second time point is an unknown in the equation.

14. The mobile system of claim 13, wherein the power estimation manager circuit is configured to correct the power of at least one of the second and third nodes by using the estimated power consumption of the first node at the second time point.

15. The mobile system of claim 13, further comprising: a display and a memory connected to the application processor.

16. The mobile system of claim 13, further comprising: a power management integrated circuit configured to provide the powers of the first, second and third nodes to the power estimation manager circuit.

17. The mobile system of claim 13, wherein the estimated power consumption of the first node at the second time point is used to determine overall power consumption of the application processor.

18. The mobile system of claim 17, wherein the overall power consumption of the application processor is used to determine overall power consumption of the mobile system.

19. The mobile system of claim 18, wherein skin temperature of the mobile system is estimated based on the overall power consumption of the mobile system.

20. A computer implemented method of estimating power consumption in an integrated circuit, comprising:

receiving from a temperature sensor, temperature data for a first node at a second time point which occurs after a first time point;

estimating, using a power estimation manager circuit configured to estimate power consumption, the power consumption of the first node at the second time point by using an equation given by:

$$Ti(t) = \left[\frac{R1idt}{2R1iC1i+dt}[P1(t)+P1(t-dt)] + \frac{2R1iC1i-dt}{2R1iC1i+dt}*Ti(t-dt)\right] +$$
$$\left[\frac{R2idt}{2R2iC2i+dt}[P2(t)+P2(t-dt)] + \frac{2R2iC2i-dt}{2R2iC2i+dt}*Ti(t-dt)\right] + \ldots +$$
$$\left[\frac{Rnidt}{2RniCni+dt}\left[\underbrace{\boxed{Pi(t)}}_{EPW}+Pi(t-dt)\right] + \frac{2RniCni-dt}{2RniCni+dt}*Ti(t-dt)\right],$$

wherein Ti(t) is a temperature of the first node at the second time point, P1(t) is a power of a second node at the second time point, P1(t–dt) is a power of the second node at the first time point, P2(t) is a power of a third node at the second time point, P2(t–dt) is a power of the third node at the first time point, Pi(t–dt) is a power of the first node at the first time point, and Pi(t) is the estimated power consumption of the first node at the second time point, Ti(t–dt) is a temperature of the first node at the first time point, and dt is a time difference between the first time point and the second time point, R1$i$ is a modeling resistance between the first node and the second node, R2$i$ is a modeling resistance between the first node and the third node, and Rni is a modeling resistance between the first node and an nth node, C1$i$ is a modeling capacitance between the first node and the second node, C1$i$–dt is the modeling capacitance between the first node and the second node minus the time difference between the first time point and the second time point, C1$i$+dt is the modeling capacitance between the first node and the second node plus the time difference between the first time point and the second time point, C2$i$ is a modeling capacitance between the first node and the third node, C2$i$–dt is the modeling capacitance between the first node and the third node minus the time difference between the first time point and the second time point, C2$i$+dt is the modeling capacitance between the first node and the third node plus the time difference between the first time point and the second time point, and Cni is a modeling capacitance between the first node and the nth node, Cni−dt is the modeling capacitance between the first node and the nth node minus the time difference between the first time point and the second time point, Cni+dt is the modeling capacitance between the first node and the nth node plus the time difference between the first time point and the second time point, wherein the estimated power consumption of the first node at the second time point is an unknown in the equation; and storing the estimated power consumption of the first node at the second time point.

21. The method of claim 20, further comprising:

correcting the power of at least one of the second and third nodes by using the estimated power consumption of the first node at the second time point.

\* \* \* \* \*